United States Patent [19]

Berchtold

[11] Patent Number: 4,528,758
[45] Date of Patent: Jul. 16, 1985

[54] GEAR MEASURING FEELER

[75] Inventor: Nikolaus Berchtold, Zürich, Switzerland

[73] Assignee: Maag Gear-Wheel and Machine Company Limited, Zurich, Switzerland

[21] Appl. No.: 560,999

[22] Filed: Dec. 13, 1983

[30] Foreign Application Priority Data

Dec. 18, 1982 [CH] Switzerland .................. 7395/82

[51] Int. Cl.³ ............................................ G01R 33/12
[52] U.S. Cl. ............................. 33/174 L; 33/179.5 R
[58] Field of Search ............. 33/174 R, 174 C, 174 L, 33/172 E, 143 L, 147 L

[56] References Cited

U.S. PATENT DOCUMENTS

| | | | |
|---|---|---|---|
| 3,943,632 | 3/1976 | Albertazzi | 33/174 L |
| 4,107,848 | 8/1978 | Boehnlein | 33/174 L |
| 4,109,200 | 8/1978 | McNulty | 33/174 L |
| 4,274,207 | 6/1981 | Flair | 33/179.5 R |
| 4,338,723 | 7/1982 | Benjamin | 33/174 L |
| 4,424,630 | 1/1984 | Aceti | 33/174 L |

*Primary Examiner*—Robert I. Smith
*Attorney, Agent, or Firm*—Werner W. Kleeman

[57] ABSTRACT

The measuring system of a gear measuring feeler in a gear measuring or testing machine comprises two oppositely arranged permanent magnets mounted at an end of a feeler rod located opposite to its end provided with a feeler probe. The measuring system further comprises a Hall-effect generator or sensor fixedly connected to a housing and arranged between the two permanent magnets and spaced therefrom. The Hall-effect generator or sensor is connected to a stationary electronic circuit containing a null point or zero compensation circuit and operational amplifiers. The measuring system supplies an output signal free of any residual or remaining carrier signal and having an extended frequency response range of up to 100 kHz. The output impedance of the measuring system is low and amounts to approximately 1 ohm. The zero point and the amplification or gain can be electrically adjusted without a change in the output impedance. The measuring system has a substantially simpler structure than known inductive measuring systems, consists of a substantially smaller number of individual members, enables a longer measuring path and provides a greater run-out distance after the feeler rod has been moved into contact with a stop.

8 Claims, 6 Drawing Figures

PRIOR ART Fig. 1
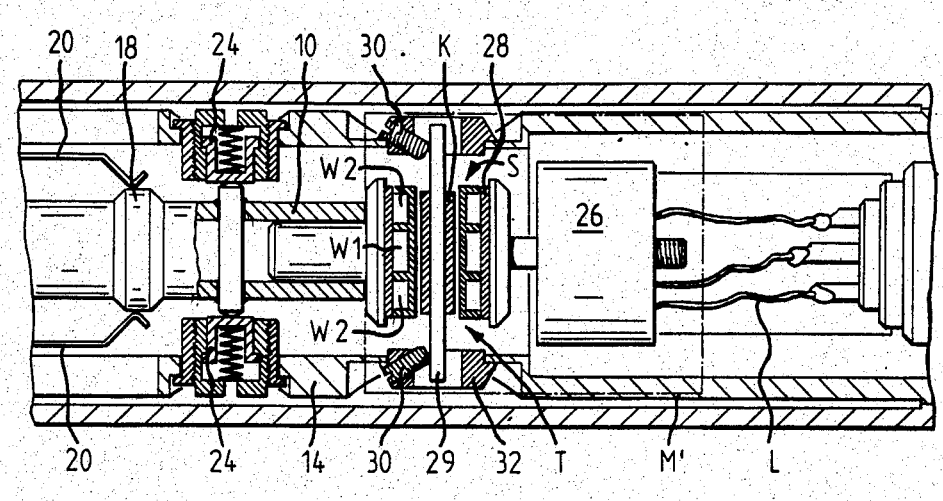
PRIOR ART Fig. 2
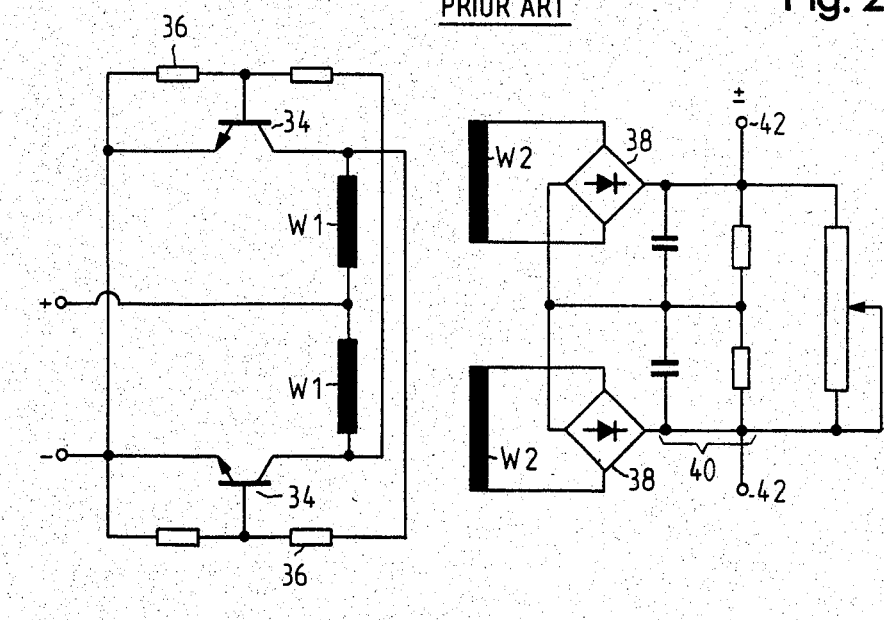

GEAR MEASURING FEELER

BACKGROUND OF THE INVENTION

The present invention relates to a new and improved gear measuring feeler.

In its more particular aspects the present invention relates to a new and improved gear measuring feeler intended for use in a gear measuring or testing machine and comprising a feeler rod which is pivotably mounted in a housing and supports at one of its ends a feeler probe and at the other end one of two relatively movable members or parts of a measuring system. The measuring system generates a magnetic field and supplies electrical signals, which are proportional to the feeler probe deflection, to a matching or accommodation circuit which transforms the electrical signals to standardized values.

In a gear measuring feeler of this type as known, for example, from German Patent Publication No. 2,364,918, published Aug. 7, 1975, and the cognate U.S. Pat. No. 3,943,633, granted Mar. 16, 1976, the electrical signals are inductively generated in response to the deflection of the feeler probe in the measuring system and converted to standardized values, so that, for example, a deflection of 1 $\mu$m corresponds to a measured voltage of 1 mV at the output of the gear measuring feeler.

In the known gear measuring feeler the feeler rod supports an exchangeable feeler probe at one end and the measuring system at the other end. The feeler rod is horizontally pivotably mounted in the housing by means of a type of torsion rod or bar and comprises a bulge portion or bead which is loaded by leaf springs. Two screws are screwed into the housing in diametrically opposed positions and perpendicular to the horizontal pivot plane defined by the feeler rod. By means of these two screws the feeler rod is allowed some play, however, is prevented from pivoting in a vertical plane. Two resilient stops are arranged in diametrical opposition to each other in the housing and within the pivoting plane of the feeler rod. These stops prevent too large horizontal pivoting movements of the feeler rod and absorb horizontal impacts of the feeler rod. The measuring system in the known gear measuring feeler comprises a differential transformer, the coil system of which is fixedly connected to the feeler rod and the transformer core of which is fixedly connected to the housing. The measuring system further comprises an electric circuit associated with the coil system and accommodated in a capsule which is also fixedly connected to the feeler rod. The electrical circuit is connected to the output terminals of the gear measuring feeler by means of highly flexible conductors.

The coil system comprises a primary coil and two secondary coils which are arranged on both sides of the primary coil. Each of the coils has been corelessly wound and is arranged in an eddy current cylinder mounted at the feeler rod. The transformer core is mounted at a brass pin which, in turn, is mounted at each one of both of its ends at two respective housing flanges by means of three adjusting screws which are in angular offset relationship from each other by 120°.

The air gap formed between the transformer core and the coil system amounts to approximately 2/10 mm, and the deflection of the coil system in the measuring range amounts to ±150 $\mu$m, corresponding to a total deflection path of the coil system of 300 $\mu$m within the measuring range. No problems occur within the measuring range due to the relative movement of the transformer core and the coil system, however, disturbances may arise when the gear measuring feeler is moved so as to abut the stop, such as during coarse operating errors. While the gear measuring feeler as such is protected by means of a throw-out or release protection provided at the feeler probe, the coil system, however, may be clamped to or bind with the transformer core adjacent the limiting stops, which in the most frequent cases results in destruction of the coils and at the very least requires readjustment of the gear measuring feeler.

The manufacture of the differential transformer and the circuit associated therewith is highly expensive in terms of work and also very troublesome. The eddy current cylinder and the transformer core are made of iron which has been subjected to a precise annealing procedure. Additionally, the transformer core still must be gold-plated as a protection against corrosion. The winding of the coreless coils is also troublesome because the same comprise a copper wire having a diameter of only some hundredths of a millimeter which carries a two-layered insulation made of nylon or polyvinylchloride (PVC) which is melted thereon under the action of heat so as to bake the coils to each other to form an inherently rigid coil system. Also the adjustment of the differential transformer is expensive and laborious because the transformer core must be very precisely mechanically adjusted by means of the adjusting screws in order to prevent mechanical eccentricities. At the same time the brass pin which supports the transformer core must be fixedly clamped using the same adjusting screws.

The construction of the electric circuitry associated with the differential transformer also is associated with great difficulties. Since the differential transformer constitutes an inductive system in which a voltage must be transmitted from the primary coil to the secondary coil only an alternating-voltage can be used. Therefore, the electric circuit contains a blocking oscillator comprising two transistors and four resistors which are supplied by a d.c.-voltage. An alternating voltage of a frequency in the range of about 7000–9000 Hz is thus generated in the primary coil. The a.c.-voltage is transferred to the secondary coils via the transformer core. Depending upon the position of the secondary coils relative to the transformer core more or less voltage is induced in one or the other of the secondary coils. The measuring signal results from the difference of the voltages induced at the two secondary coils. The a.c.-voltage is rectified in rectifiers, smoothed in a filter and then is applied to the output terminals. In such known circuitry difficulties result by virtue of the requirement that the two transistors have to be as equal to one another as possible, i.e. should have operating or working points as close to one another as possible since otherwise they would generate rectangular or squarewave pulses of unequal width, so that the measuring result would be negatively affected. The use of paired transistors, however, requires precise measurement of the same, a process which is quite expensive. Furthermore, the measuring voltage which is obtained at the output terminals includes a remaining or residual carrier signal of 20 mV which cannot be eliminated. As long as the measuring signal is directly fed to a recording system containing mechanical attenuation or dampening, the remaining or residual portion of the carrier is not disadvantageously noticed. Presently, however, the measuring signals are conducted via A/D-converters and are further processed in a computer, in which case the residual portion of the carrier signal may result in incorrect results. Such could only be prevented by working either with considerably more expensive circuits or with a d.c.-voltage. For the reasons indicated hereinbefore the latter is impossible with the inductive measuring system of the known gear measuring feeler.

Furthermore, the measuring system in the prior art gear measuring feeler is supplied from a separate external current source comprising an integrated circuit. This expense is necessary because the blocking oscillator must be supplied with a constant current, so that it can correctly operate throughout the entire intended temperature range.

Additionally, the output of the measuring system of the known gear measuring feeler is a high-impedance or high-ohmic output. However, it is always of greater advantage when long conductors connected thereto would have a low-impedance line termination because in such case interfering stray pick-ups would be smaller.

Finally, the frequency response range in the measuring system of the prior art gear measuring feeler is relatively limited and only amounts to about 0.5 kHz. The carrier of the information in the measuring system has a frequency in the range of 7–9 kHz, some time-constants are present therein due to mechanical inertia and, finally, the filter is a low-frequency filter i.e. possesses a large inertia, which is needed in order to hold the residual portion of the carrier frequency signal as small as possible. Due to all these circumstances the frequency response range is no higher than about 0.5 kHz.

SUMMARY OF THE INVENTION

Therefore, with the foregoing in mind it is a primary object of the present invention to provide a new and improved gear measuring feeler which has a more simply designed measuring system.

Another important object of the present invention is directed to the provision of a new and improved gear measuring feeler which can be substantially more simply mounted and adjusted.

Still a further significant object of the present invention is directed to a new and improved construction of a gear measuring feeler which has a substantially wider frequency response range than the prior art constructions.

Another important object of the present invention is directed to a new and improved construction of a gear measuring feeler which has a low-impedance or low-ohmic output.

Now in order to implement these and still further objects of the invention, which will become more readily apparent as the description proceeds, the gear measuring feeler of the present development is manifested by the features that, the two members or parts of the measuring system which are movable relative to each other comprise means for generating a static magnetic field and a Hall-effect generator or sensor, and the matching or accommodation circuit is mounted in the housing.

In the measuring system of the gear measuring feeler according to the invention the air gap between the aforementioned two members which are movable relative to each other is substantially greater than the air gap between the transformer core and the coil system in the known gear measuring feeler. Therefore, neither binding or jamming nor any mutual contact can occur between the members or parts which are movable relative to each other even during maximum deflection of the feeler rod. Since the matching circuit is mounted in the housing there is no danger that the connecting conductors could break and which are connected to the connection terminals of the gear measuring feeler.

Since the Hall-effect generator or sensor used in the inventive gear measuring feeler operates only with d.c.-voltage, no residual portion of a carrier frequency signal results, so that the obtained measuring signal can be further processed with substantially higher precision. Since there are no limitations present with respect to the frequency response range, when a Hall-effect generator or sensor is used, the gear measuring feeler can be operated at a frequency response range extending up to 100 kHz while taking into account the mechanical system. In the inventive gear measuring feeler the output impedance amounts to 1 ohm as compared to 50 kiloohm in the known gear measuring feeler. The disturbance protection is thus substantially increased in the gear measuring feeler according to the invention. Furthermore, the measuring system in the inventive gear measuring feeler does not require any special power supply, so that the constant current source provided in the known gear measuring feeler can be eliminated. Moreover, the greater run-out distance enables a substantially greater measuring distance of $\pm 500$ $\mu$m as compared to $\pm 150$ $\mu$m in the known gear measuring feeler based on the same measuring precision of, for example, 2 percent.

In a preferred embodiment of the inventive gear measuring feeler the static magnetic field is generated by two permanent magnets which can be mounted either at the feeler rod or at the housing. The mounting at the feeler rod is preferred since in such case no electrical conductors have to be connected to the movable member of the measuring system because, in such case, also the Hall-effect generator or sensor is stationarily arranged in the housing.

Advantageously, a steel concentrator ring is provided which, on the one hand, concentrates the flux density between the permanent magnets and, on the other hand, protects against external magnetic effects.

In a further preferred design of the gear measuring feeler according to the invention, the Hall-effect generator or sensor constitutes a commercially available article, preferably produced according to thick film technology and laser trimmed. The Hall-effect generator or sensor can be mounted in a simple manner using a holder made of a light metal or the like and using just one screw or threaded bolt.

Another preferred design of the inventive gear measuring feeler comprises a matching or accommodation circuit of a very simple design comprising two operational amplifiers and a null point or zero compensation circuit. Such a circuit arrangement enables performing a zero compensation in a simple manner by means of which any tedious mechanical adjustment is eliminated, such as required in the known gear measuring feeler.

Advantageously, samarium-cobalt permanent magnets are used in the inventive gear measuring feeler. Such have a magnetic field strength or intensity which is greater by a factor of about 5 as compared to magnets made of an aluminum-nickel-cobalt alloy. Furthermore, such permanent magnets have a very good long-term stability with respect to temperature and field strength.

It remains to be stated that the measuring system in the inventive gear measuring feeler contains a considerably smaller number of individual parts, approximately half as many parts, as the measuring system in the known gear measuring feeler.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various Figures of the drawings there have been generally used the same reference characters to denote the same or analogous components and wherein:

FIG. 1 is a partial sectional view in the horizontal pivoting plane of the feeler rod in a prior art gear measuring feeler which illustrates the measuring system therein;

FIG. 2 is an electric circuit diagram of the measuring system in the prior art gear measuring feeler shown in FIG. 1;

DETAILED DESCRIPTION OF THE PREFERRED EMBODIMENTS

Describing now the drawings, it is to be understood that only enough of the construction of the gear measuring feeler has been shown as needed for those skilled in the art to readily understand the underlying principles and concepts of the present development, while simplifying the showing of the drawings. Turning attention now specifically to FIGS. 1 and 2 of the drawings, there has been shown therein a partial sectional view of a prior art gear measuring feeler and the electric circuit diagram thereof.

Figure 3:
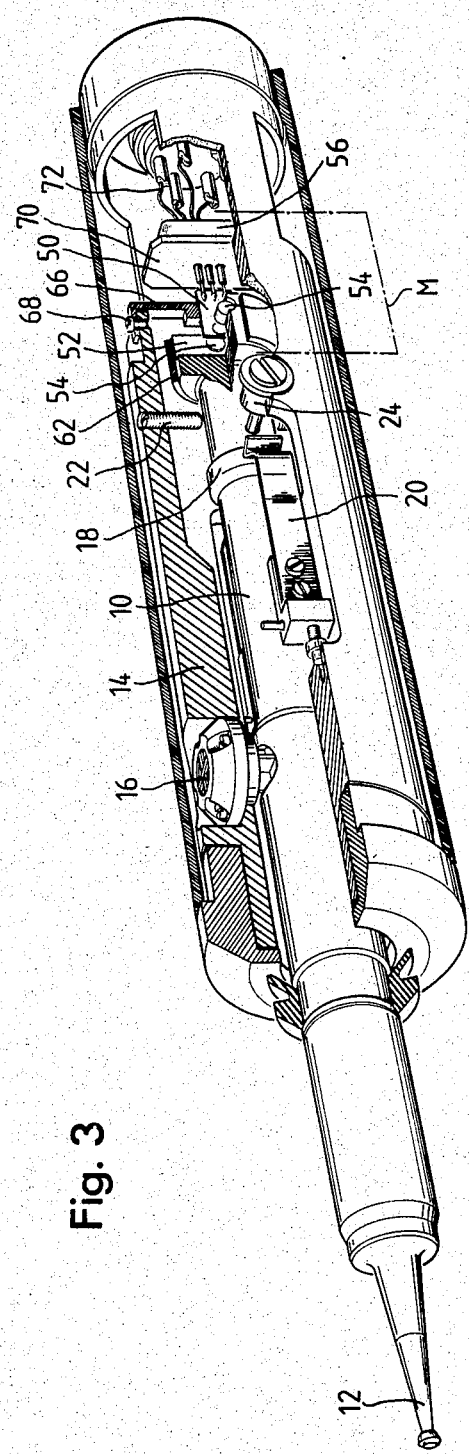
FIG. 3 is a perspective and partially sectional illustration of a first embodiment of the gear measuring feeler according to the invention which differs from the known gear measuring feeler shown in FIG. 1 primarily by the design of the measuring system.

In the prior art system a feeler rod 10, a feeler probe 12 and a torsion bar 16 are present the same as shown in the arrangement of FIG. 3. The feeler rod 10 carries the exchangeable feeler probe 12 at one end and a measuring system M' at the other or opposite end. This feeler rod 10 is horizontally pivotably mounted in a housing 14 by means of a type of torsion bar or rod 16. The feeler rod 10 is provided with a bulge or bead 18 which is subjected to the load of leaf springs 20 or equivalent structure. Two screws 22 which are not visible in FIG. 1 because the sectional view shown therein is in the pivoting plane of the feeler rod, are screwed into the housing 14 in diametrically opposed positions and substantially perpendicular to the horizontal pivoting plane of the feeler rod 10. Thus, the feeler rod 10 is provided with some play, however, prevented from pivoting in a vertical plane. Two resilient stops or abutments 24 are mounted in diametrically opposed relationship to each other in the housing 14 and in the pivoting plane of the feeler rod 10. The stops 24 prevent too extensive horizontal deflections of the feeler rod 10 and absorb horizontal impacts of the feeler rod 10. The measuring system M' of the gear measuring feeler shown in FIG. 1 comprises a differential transformer T, the coil system S of which is fixedly mounted to the feeler rod 10 and the transformer core K of which is fixedly mounted to the housing 14. The measuring system M' further comprises an electric circuit operatively associated with the coil system S which is accommodated in a capsule 26 which is also fixedly connected to the feeler rod 10. The electric circuit is connected to the output terminals of the gear measuring feeler via highly flexible conductors or wires L.

The coil system S comprises a primary coil W1 and two secondary coils W2 which are arranged on both sides of the primary coil W1. The coils are corelessly wound and arranged in an eddy current cylinder 28 which is mounted at the feeler rod 10. The transformer core K is mounted at a brass pin 29 which, in turn, is mounted at each of its ends in a respective housing flange 32 by means of three adjusting screws 30 which are angularly offset from each other by 120°.

A first embodiment of the gear measuring feeler according to the invention is illustrated in FIGS. 3 to 6 and differs from the prior art gear measuring feeler as illustrated and described with reference to FIGS. 1 and 2 mainly by the design of the measuring system, wherefore only the latter is described in detail hereinafter.

Figure 4:
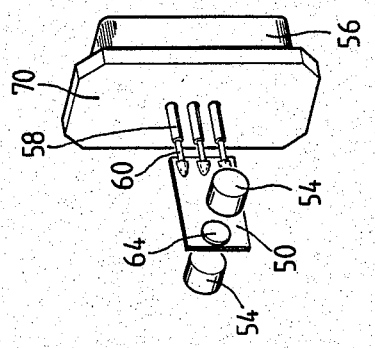
FIG. 4 is a perspective view of a detail of the measuring system of the gear measuring feeler shown in FIG. 3.

As shown in FIGS. 3 and 4 the measuring system M comprises a Hall-effect generator which is collectively designated by reference character 50. Furthermore, the measuring system M comprises two permanent magnets 54 which are arranged at diametrically opposite sides of the Hall-effect generator or sensor 50 and spaced therefrom at a magnet support 52. Finally, the measuring system M comprises an electronic component or section collectively designated by reference numeral 56 and containing a matching or accommodation circuit and connector sockets 58 into which corresponding connector pins 60 of the Hall-effect generator or sensor 50 are plugged.

In the presently described embodiment the permanent magnets 54 constitute robust magnets made of a samarium-cobalt alloy which generate a very high field strength or intensity and have a particularly high long-term stability. The permanent magnets 54 are inserted into not particularly referenced diametrically opposed bores provided in the magnet support 52. The magnet support 52 is fixedly connected to one end of the feeler rod 10 which is the right-hand end as viewed in FIG. 3. The magnet support 52 is a simple machined member made of light metal or plastics and obtained, for instance, by a lathe operation and which can be produced without any great expense. The magnet support 52 is surrounded by a concentrator ring or ring member 62 which in the presently described embodiment is made of steel and can also be produced without any great expense because it does not require any specific treatment like annealing and so forth. By means of the concentrator ring 62 the magnetic flux density is concentrated between the permanent magnets 54 and external or spurious magnetic influences are kept away from the permanent magnets 54 as well as from the Hall-effect generator or sensor 50. The permanent magnets 54 are inserted into the magnet support 52 in such a manner that like poles of the permanent magnets 54 face each other.

Figure 5:
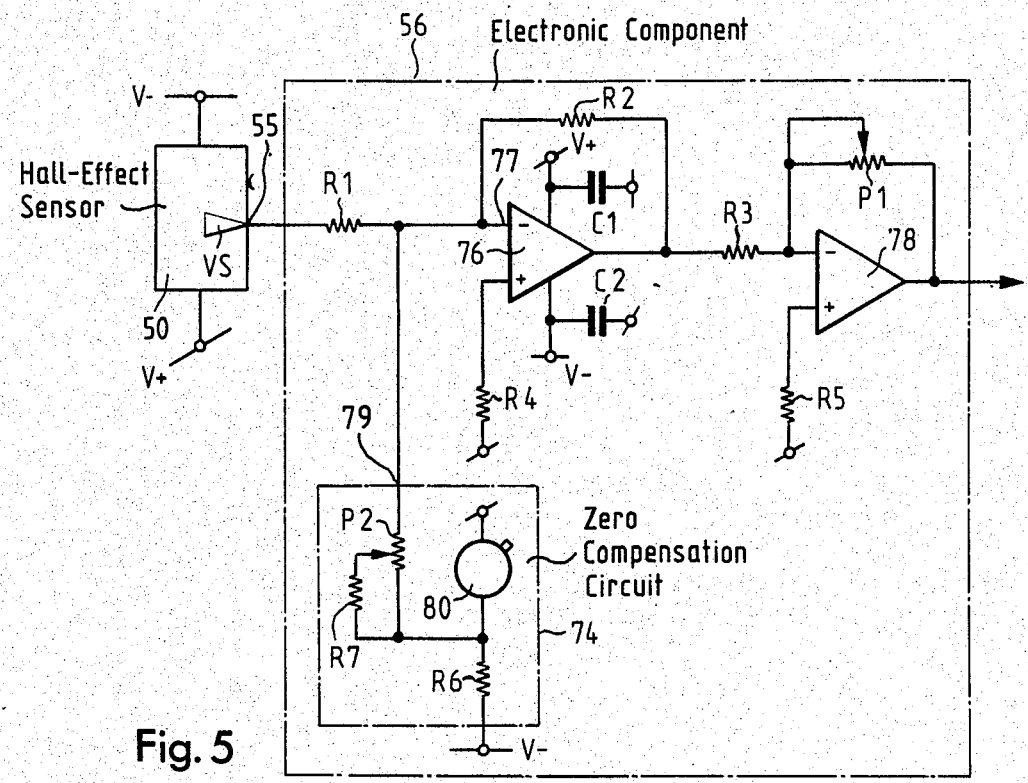
FIG. 5 is an electric circuit diagram of the measuring system of the gear measuring feeler shown in FIG. 3.

The Hall-effect generator or sensor 50 is a commercially available component, i.e. an integrated circuit on a small ceramic plate or substrate which is obtained according to thick film techniques and which contains the actual Hall-effect generator element 64, a voltage regulator and an amplifier VS (FIG. 5). The integrated circuit arranged on the small ceramic substrate or plate is connected to the electronic component 56 via the connector pins 60 and the connector sockets 58 which will be further described hereinafter with reference to FIG. 5. The Hall-effect generator element 64 which is schematically illustrated as a button-like member in FIGS. 3 and 4, is arranged at the center between the permanent magnets 54. An air gap amounting from 1 to several millimeters is present on each side of the Hall-effect generator element 64 between the same and the related one of the permanent magnets 54. Therefore, when the feeler rod 10 is pivoted to one of the stops or abutments 24, mutual contact between the Hall-effect generator or sensor 50 and the permanent magnets 54 is prevented. The path of the deflection of the feeler rod 10 which can be used for the measurement amounts to about 500 μm in the linear measuring range and on the basis of a measuring precision of 2 percent as compared to about 150 μm in the known gear measuring feeler as shown in FIGS. 1 and 2 and based on the same measuring precision. The Hall-effect generator or sensor 50 is mounted at a holder 66 which, in turn, is mounted at the housing 14 by means of a screw or bolt 68. The holder or support member 66 is made of, for example, light metal. The electronic component 56 is mounted on one side of a small plastic plate 70 which is mounted at the Hall-effect generator or sensor 50 by means of the plug connection between the connector pins 60 and the connector sockets 58 on its other side. The diagonal distance between bevelled corners of the small plastic plate 70 corresponds to the internal diameter of the housing 14, whereby it is ensured that the electronic component 56 is sufficiently retained. Since the electronic component 56 conjointly with the Hall-effect generator or sensor 50 is fixedly arranged within the housing 14 such that it is unable to participate in the movements of the feeler rod 10, the electronic component 56 can be connected to the connector socket of the gear measuring feeler by stationary connecting wires or conductors 72.

In the first embodiment of the inventive gear measuring feeler as described hereinbefore the magnet support 52 is mounted at the right-hand end of the feeler rod 10 and the Hall-effect generator or sensor 50 is mounted at the housing 14. Such a design is preferred because a direct and rigid connection between the connector pins 60 and the connector sockets 58 can be provided for connection of the Hall-effect generator or sensor 50 to the electronic component 56.

Figure 6:
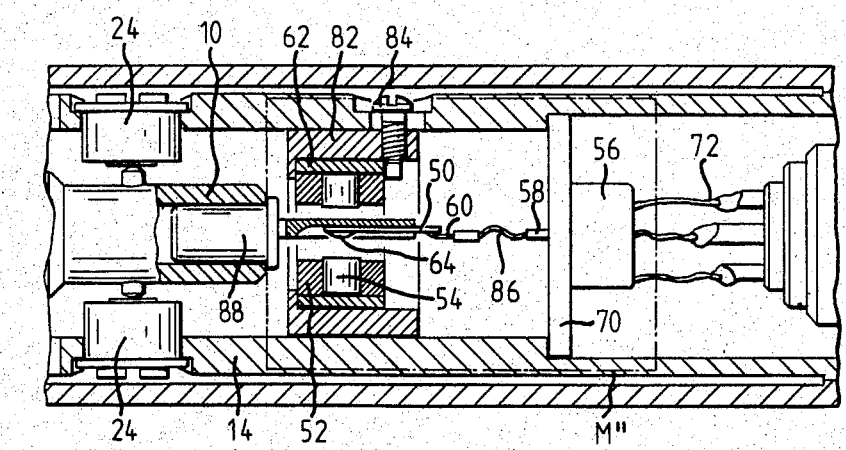
FIG. 6 is a view similar to that of FIG. 3 and depicting a second embodiment of the inventive gear measuring feeler.

A second embodiment of the gear measuring feeler according to the invention is illustrated in FIG. 6. Therein the magnet support 52 including the concentrator ring 62 is mounted at the housing 14 by means of a sleeve or bushing 82 and a screw or bolt 84. The Hall-effect generator or sensor 50 is mounted at the right-hand end of the feeler rod 10 by means of a holder 88. Since now the Hall-effect generator or sensor 50 is movable conjointly with the feeler rod 10, a connection made by highly flexible conductors or wires 86 is provided between the connector pins 60 and the connector sockets 58.

The design of the electronic component 56 and the connection thereof to the Hall-effect generator or sensor 50 are illustrated in FIG. 5. The Hall-effect generator or sensor 50 is a commercially available component, as is indicated hereinafter in greater detail, and, therefore, the structure thereof need not be here described in any particular detail. Merely, the amplifier VS which is already integrated into the Hall-effect generator or sensor is indicated in FIG. 5. The Hall-effect generator or sensor 50 and the electronic component 56 series connected thereto are supplied by a d.c.-current source which is usually present at the gear measuring or testing machine with which the gear measuring feeler as illustrated is used. The d.c.-current source supplies a d.c.-voltage of ±15 V. A matching or accommodation circuit is contained in the electronic component 56 and connected to the output 55 of the Hall-effect generator 50. The matching circuit substantially contains a null point or zero compensation circuit 74 and two series connected operational amplifiers 76, 78 having an input 77. The operational amplifiers 76, 78 form identical integrated circuits which are merely differently connected as illustrated in FIG. 5. The zero compensation by means of the circuit 74 is required because the Hall-effect generator or sensor 50 is operated only at one d.c.-voltage value while, upon measuring the tooth flanks using the gear measuring feeler, the deflection of the feeler probe 12 to the positive side and to the negative side from a predetermined zero position has to be measured. Since the d.c.-voltage as present is only a unidirectional voltage, the measuring voltage at the output, however, is intended to be as highly informative as possible, i.e. a deflection to the left is intended to result in a positive voltage and a deflection to the right is intended to result in a negative voltage, the output voltage of the Hall-effect generator or sensor 50 has to be rendered symmetrical. For this purpose the zero or null point compensation circuit 74 supplies a voltage at its output 79 which is added to the output voltage of the Hall-effect generator or sensor 50 forwardly of the operational amplifier 76. The operational amplifier 76 serves to adjust for differences in the Hall-effect generator or sensor 50 since such Hall-effect generators or sensors cannot be matched already during manufacture thereof in such a way as to supply the same output voltage.

The output 55 of the Hall-effect generator or sensor 50 is connected via a resistor R1 to the inverting input of the operational amplifier 76 which is also the common input of the series connection of the operational amplifiers 76, 78. The output of the operational amplifier 76 is also connected to the inverting input thereof via a resistor R2. Furthermore, the output of the operational amplifier 76 is connected via a resistor R3 to the inverting input of the other operational amplifier 78. The output thereof is connected to the inverting input of such operational amplifier 78 via a potentiometer P1 in the manner as illustrated. The non-inverting inputs of the operational amplifiers 76 and 78 are connected to the current supply source via the resistors R4 and R5, respectively. The connections for the positive and the negative supply voltage to the operational amplifier 76 are connected to the terminals V+ and V−, respectively, and in each case there is interconnected therebetween a respective capacitor C1, C2. The output 79 of the zero compensation circuit 74 is connected to the inverting input of the operational amplifier 76, as shown.

The zero compensation circuit 74 contains a reference voltage transmitter 80 which is constituted by an integrated circuit supplying a voltage of the current supply source which is thermally stable and independent of eventual fluctuations and which is connected to the current supply source via a resistor R6. The junction between the reference voltage transmitter 80 and the resistor R6 is connected to the inverting input of the operational amplifier 76 via a potentiometer P2 including a resistor R7 in the slider circuit thereof in the manner as illustrated. The zero voltage which is adjustable by means of the potentiometer P2 is added to the voltage supplied by the Hall-effect generator or sensor 50 following the resistor R1 and is applied to the operational amplifier 76.

The operational amplifier 78 serves to adjust the amplification or gain by means of which the output signal of the Hall-effect generator or sensor 50 is evaluated with respect to the generated Hall-voltage. In the embodiments described herein the evaluation is such that an output voltage of 10 mV corresponds to a feeler deflection of 1 $\mu$m.

Mechanical eccentricities can be balanced in a simple manner and contrary to the complicated mechanical adjustment in the known gear measuring feeler in an electrical manner by adjusting the amplification or gain at the potentiometer P1 and the zero compensation or correction voltage at the potentiometer P2. The zero point and the amplification are electrically adjustable without a change in the output impedance. Advantageously, the output impedance of the gear measuring feeler as described hereinbefore is very low and amounts to about 1 ohm contrary to the very high output impedance of 50 kiloohms in the prior art gear measuring feeler.

The gear measuring feeler as described hereinbefore operates with a d.c.-voltage instead of with a carrier a.c.-voltage. Therefore, the measuring signal obtained at the output is totally free of any residual or remaining portions of the carrier frequency signal. For the same reason there can also be achieved a very high frequency response range up to 100 kH because no electrical inertia is present in the measuring system due to the absence of filters and the frequency response range is only governed by the mechanical system.

Already existent gear measuring feelers can be retrofitted in a very simple manner with the measuring system M as described hereinbefore, since only the measuring system M' as illustrated in FIGS. 1 and 2 will have to be replaced by the measuring system M or M" as shown in FIGS. 4 and 6, respectively.

In the embodiment of the inventive gear measuring feeler and as illustrated in FIG. 5 the following elements have been used:

| Reference Numeral | Electrical Element | Num. Value | Type |
|---|---|---|---|
| 76, 78 | Operational Amplifier | | IC 1458 |
| P1 | Wire Potentiometer | 20 | |
| P2 | Wire Potentiometer | 5 | |
| R1 | Resistor | 10 | |
| R2 | Resistor | 10 | |
| R3 | Resistor | 10 | |
| R4 | Resistor | 5 | |
| R5 | Resistor | 5 | |
| R6 | Resistor | 15 | |
| R7 | Resistor | 5 | |
| C1, C2 | Capacitor | 0.1 $\mu$F | |
| 80 | Reference Voltage Transmitter | | IC LM 113 (National Semicond.) |
| 50 | Hall-effect generator or sensor | | 92 SS 12 2 (Honeywell) |

The resistances are given in kiloohms and each resistor is a film resistor having an electrical power of ⅛ watt.

While there are shown and described present preferred embodiments of the invention, it is to be distinctly understood that the invention is not limited thereto, but may be otherwise variously embodied and practiced within the scope of the following claims. Accordingly,

What I claim is:

1. A gear measuring feeler comprising:
a housing;
a feeler rod pivotably mounted in said housing and deflectable from a predetermined position;
said feeler rod having a first end and a second end;
a feeler probe mounted to said first end of said feeler rod;
a measuring system comprising two members which are movable relative to each other;
one of said two members being supported at said second end of said feeler rod;
said two members comprising means for generating a static magnetic field and a Hall-effect generator;
said measuring system generating electrical signals proportional to the deflection of said feeler rod from said predetermined position;
a matching circuit operatively connected to said measuring system to receive and standardize said electrical signals; and
said matching circuit being mounted inside said housing.

2. The gear measuring feeler as defined in claim 1, wherein:
said means for generating a static magnetic field comprise a magnet support and two permanent magnets; and
said two permanent magnets being diametrically arranged on opposite sides of and in spaced relationship from said Hall-effect generator.

3. The gear measuring feeler as defined in claim 2, wherein:
said magnet support forms said one of said two members which is supported at said second end of said feeler rod; and
said Hall-effect generator being mounted at said housing.

4. The gear measuring feeler as defined in claim 2, wherein:
said magnet support is mounted at said housing; and
said Hall-effect generator forming said one of said two members which is supported at said second end of said feeler rod.

5. The gear measuring feeler as defined in claim 2, further including:
a concentrator ring surrounding said magnet support; and
said concentrator ring being made of steel.

6. The gear measuring feeler as defined in claim 1, wherein:
said Hall-effect generator comprises an integrated circuit mounted at a ceramic base plate; and
said integrated circuit containing a Hall-effect generator element, a voltage regulator and an amplifier.

7. The gear measuring feeler as defined in claim 1, wherein:
said Hall-effect generator has an output;
said matching circuit comprising a series connection of two operational amplifiers having an input, a zero compensation circuit including a reference voltage generator and having an output; and said input of said series connection of said two operational amplifiers being connected to said output of said Hall-effect generator as well as to said output of said zero compensation circuit.

8. The gear measuring feeler as defined in claim 2, wherein:

each of said two permanent magnets is made of a samarium-cobalt alloy.

* * * * *